3,109,741
FLAVORING AND PREPARATION THEREOF
Bunichi Toi, Yokohama City, Seiichi Maeda, Kawasaki City, and Shingo Ikeda and Hideko Furukawa, Tokyo, all in Japan, assignors to Ajinomoto Co., Inc., Tokyo, Japan
No Drawing. Filed Dec. 14, 1960, Ser. No. 75,683
Claims priority, application Japan May 10, 1960
14 Claims. (Cl. 99—140)

The present invention relates to flavorings which may be used in cooking or at the table to improve the taste of foods or dishes, and particularly to flavorings prepared by homogencously mixing a minute quantity of sodium inosinate with alkali metal salts of L-α-amino-dicarboxylic acids such as monosodium L-glutamate, monosodium L-aspartate, monosodium threo-β-hydroxy-L-glutamate and monosodium L-α-amino-adipate or monosodium L-homocysteinate.

It has been well known that monosodium glutamate is a palatable compound, the free acid having the chemical formula

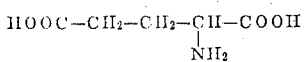

The sodium salt of inosinic acid having the chemical formula

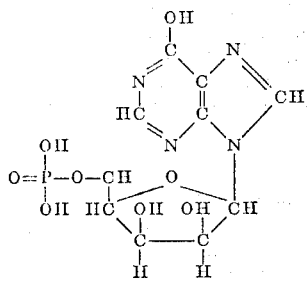

has been known as a palatable constituent in fish and meat.

It has now been found that the addition of an extremely minute quantity of sodium inosinate to monosodium L-glutamate strengthens the taste of the latter even if the amount of sodium inosinate is below the threshold value at which the taste of sodium inosinate alone can be perceived. The taste of monosodium L-glutamate is different from that of sodium inosinate, and the above-taste of the mixture is quite different from the combined taste of the two compounds.

The threshold value of monosodium glutamate has been reported to range from 0.04% to 0.03%. According to a recent determination by a test panel of about 50 research workers, this threshold value is 0.025%.

The members of the test panel were screened first by the organoleptic test for taste threshold from a large group of candidates. They were more narrowly selected according to their ability for sensing a concentration difference, and further trained specifically for their task. About 50 taste testers participitated in each test. Although a sensory test is not perfect, taste is a matter of human sense and there is no way of numerically evaluating taste by chemical means or physical or electrical apparatus. The organoleptic test is the best and only one for the measurement of taste at present, and is widely used in various countries. Judgment of the testers was evaluated by statistical methods. Therefore, results obtained by the tests are sufficiently reliable to have scientific meaning.

The threshold value of sodium inosinate which has never been reported was determined as being 0.025% by the test panel. In other words, the taste of sodium inosinate can be sensed by human beings only when its concentration in an aqueous solution is more than 0.025% in the absence of other substances having a taste.

We have now found that sodium inosinate enhances the taste of monosodium glutamate even when the inostinate is present at a concentration much lower than its threshold value of 0.025%, for example 0.0003%, which cannot be tasted per se. This fact was firmly established by many repeated experiments as follows.

The taste test panel was given five tasting samples of aqueous solutions of monosodium glutamate representing four levels of concentration which could be readily distinguished by them. One sample had been mixed with a minute quantity of sodium inosinate. The tasters were directed to assign a rank to each sample in order of the strength of taste avoiding judgment of the same strength in two samples. Each sample also contained 1% of table salt which usually facilitates the tasting of aqueous solutions.

EXPERIMENT 1

The following five solutions were tested:

| Sample | Table salt (percent) | Monosodium glutamate (percent) | Sodium inosinate (percent) |
|---|---|---|---|
| A | 1.0 | 0.10 | 0.001 |
| B | 1.0 | 0.15 | 0 |
| C | 1.0 | 0.20 | 0 |
| D | 1.0 | 0.25 | 0 |
| E | 1.0 | 0.30 | 0 | by a panel consisting of 57 taste testers and the results were as shown in the following table:

| Sample | A | B | C | D | E |
|---|---|---|---|---|---|
| | Number of testers | | | | |
| Rank assigned: | | | | | |
| No. 1 | 9 | 1 | 4 | 7 | 36 |
| No. 2 | 20 | 2 | 4 | 18 | 13 |
| No. 3 | 17 | 3 | 14 | 20 | 3 |
| No. 4 | 8 | 13 | 26 | 7 | 3 |
| No. 5 | 3 | 38 | 9 | 5 | 2 |
| Total | 147 | 256 | 203 | 156 | 93 |
| Mean rank | 2.58 | 4.49 | 3.56 | 2.74 | 1.63 |

NOTE:
Coefficient of concordance—W=0.4658
Statistic—$F_0$=49.11
Degrees of freedom—$\phi_1$=4; $\phi_2$=222
Level of significance—1%
Rank—E>A>D>C>B The panel thus found that solution A containing monosodium glutamate and sodium inosinate in a ratio of 100 to 1 (0.1% of monosodium glutamate and 0.001% of sodium inosinate) surpasses solution D (containing 0.25% of monosodium glutamate only) in the strength of taste. In another experiment carried out to check this result, no difference was found between a sample containing 0.1% of monosodium glutamate and 0.001% of sodium inosinate and another sample containing 0.25% of monosodium glutamate.

The taste of 0.1% monosodium glutamate solution is enhanced 2.5-fold by adding sodium inosinate in an amount equal to one hundredth of said glutamate. The sodium inosinate used enhances the taste of a sample in a manner equivalent to 150 times its own weight in monosodium glutamate.

EXPERIMENT 2

The following five solutions were tested:

| Sample | Table salt (percent) | Monosodium glutamate (percent) | Sodium inosinate (percent) |
|---|---|---|---|
| F | 1.0 | 0.1 | 0.002 |
| G | 1.0 | 0.2 | 0 |
| H | 1.0 | 0.3 | 0 |
| I | 1.0 | 0.4 | 0 |
| J | 1.0 | 0.5 | 0 | by a panel consisting of 49 taste testers and the results were as shown in the following table:

| Sample | F | G | H | I | J |
|---|---|---|---|---|---|
| | \multicolumn{5}{c}{Number of testers} | | | | |
| Rank assigned: | | | | | |
| No. 1 | 19 | 2 | 3 | 5 | 20 |
| No. 2 | 14 | 0 | 1 | 13 | 21 |
| No. 3 | 7 | 4 | 16 | 18 | 4 |
| No. 4 | 8 | 7 | 21 | 11 | 2 |
| No. 5 | 1 | 36 | 8 | 2 | 2 |
| Total | 105 | 222 | 177 | 139 | 92 |
| Mean rank | 2.14 | 4.53 | 3.61 | 2.84 | 1.88 |

NOTE:
Coefficient of concordance—$W=0.4739$
Statistic—$F_0=43.239$
Degrees of freedom—$\phi_1=4$; $\phi_2=190$
Level of significance—1%
Rank—J>F>I>H>G The taste of 0.1% monosodium glutamate solution is enhanced to that corresponding to a solution having almost the 5-fold concentration (0.4–0.5%) by adding sodium inosinate in an amount of 2/100 of said glutamate.

EXPERIMENT 3

The following five solutions were tested:

| Sample | Table salt (percent) | Monosodium glutamate (percent) | Sodium inosinate (percent) |
|---|---|---|---|
| K | 1.0 | 0.10 | 0.004 |
| L | 1.0 | 0.33 | 0 |
| M | 1.0 | 0.50 | 0 |
| N | 1.0 | 0.75 | 0 |
| O | 1.0 | 1.125 | 0 | by a panel consisting of 48 taste testers and the results were as shown in the following table:

| Sample | K | L | M | N | O |
|---|---|---|---|---|---|
| | \multicolumn{5}{c}{Number of testers} | | | | |
| Rank assigned: | | | | | |
| No. 1 | 5 | 0 | 0 | 3 | 40 |
| No. 2 | 13 | 3 | 2 | 22 | 8 |
| No. 3 | 26 | 1 | 1 | 20 | 0 |
| No. 4 | 4 | 7 | 34 | 3 | 0 |
| No. 5 | 0 | 37 | 11 | 0 | 0 |
| Total | 125 | 222 | 198 | 119 | 56 |
| Mean rank | 2.60 | 4.63 | 4.13 | 2.48 | 1.17 |

NOTE:
Coefficient of concordance—$W=0.7695$
Statistic—$F_0=156.90$
Degrees of freedom—$\phi_1=4$; $\phi_2=186$
Level of significance—1%
Rank—O>N>K>M>L The taste of 0.1% monosodium glutamate solution is enhanced to that corresponding to a solution having a 7.5-fold concentration by adding sodium inosinate in an amount of 4/100 of said glutamate.

The same results were obtained when table salt was omitted and the rank was the same in both cases. In these experiments without salt, panels consisting of about 50 testers were used, as in Examples 1–3.

Although the amount of monosodium glutamate to be used varies with different foods, its concentration in dishes when served is approximately 0.1–0.3%, as in consommé or the like. This is the reason why such a concentration was adopted in the above experiments.

The facts observed may be explained as follows. Monosodium glutamate in an aqueous solution of 0.1% stimulates only the taste buds at the root of the tongue. In a solution of 0.3% or higher concentration, however, the taste buds on the whole surface of the tongue are simultaneously stimulated. The taste of a monosodium glutamate solution of about 0.1% concentration is strengthened by the addition of as little as 0.001–0.004% of sodium inosinate, which can not be sensed by itself, because the taste buds at the tip and the middle portion of the tongue are also stimulated just as by 0.3% or more monosodium glutamate. The taste enhancing action of sodium inosinate in a concentration lower than its threshold value may be termed activation.

The alkali metal salts of L-α-amino-dicarboxylic acids having 4–7 carbon atoms have a more or less pleasant taste, and that of L-glutamate is most pleasant. Alkali metal salts of homocysteic acid, which have a structure analogous to said α-amino-dicarboxylic acid salts, also have such a taste.

L-aspartic acid having the chemical formula,

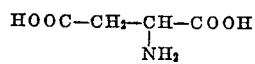

which is the adjacent homolog of L-glutamic acid, has only 4 carbon atoms and accordingly its pleasant taste component is feeble and accompanied by an acidic taste. Since sodium L-aspartate has an analogous chemical structure to sodium L-glutamate, its chemical properties are analogous to those of the latter. However, crystals or a saturated aqueous solution of sodium L-aspartate tastes somewhat salty, with a pleasant after-taste. Therefore, neither L-aspartic acid nor its salt has ever been thought of as a flavoring or seasoning.

It has now been found that the addition of an extremely minute quantity of sodium inosinate, lower than its threshold value, to monosodium L-aspartate strongly enhances the taste of the latter, as in the case of the aforementioned monosodium L-glutamate.

The threshold value of monosodium L-aspartate has not been found in the literatures. Our taste test panel found the threshold value to be 0.1%. The taste of said aspartate or that of said inosinate can be evidently sensed only when their concentrations in separate aqueous solutions are more than 0.1% or 0.025% respectively.

0.1% aqueous solutions of monosodium L-aspartate with and without approximately 0.0025% of sodium inosinate were tested by a panel, all members of which sensed the enhanced taste of the mixture. In a test of 0.01% aqueous solutions of sodium inosinate (below the threshold value) and with and without approximately 0.01% of monosodium L-aspartate, the taste testers clearly distinguished the tastes of the solutions. The following table shows the results of the test.

A. Concentration of tested solutions:

| Sample | Monosodium L-aspartate (percent) | Sodium inosinate (percent) |
|---|---|---|
| 1 | 0.1 | 0 |
| 2 | 0.1 | 0.005 |
| 3 | 0.1 | 0.0025 |
| 4 | 0.1 | 0.00125 |
| 5 | 0 | 0.01 |
| 6 | 0.02 | 0.01 |
| 7 | 0.01 | 0.01 |
| 8 | 0.005 | 0.01 |

B. Results of the test:

| Combination of samples | | Number of testers | Number of times correctly sensed | Level of significance |
|---|---|---|---|---|
| 1 | 1 | 2 | 10×2 | 20 | * * * |
| 1 | 1 | 3 | 10×2 | 20 | * * * |
| 1 | 1 | 4 | 10×2 | 8 | — |
| 5 | 5 | 6 | 10×2 | 13 | * * |
| 5 | 5 | 7 | 10×2 | 14 | * * * |
| 5 | 5 | 8 | 10×2 | 5 | — |

NOTE:
* * * 0.1% significant.
* * 1% significant.
— Not significant.

As seen from the experiment, in an aqueous solution jointly containing L-aspartate and inosinate, the taste of either compound is enhanced by the other even when the amount of one of them is as little as 1/10 of its threshold value. In other words, aspartate and inosinate have a mutual accentuating effect and taste-activating action.

A test panel was given four aqueous solutions of different concentrations of monosodium L-glutamate, which could be clearly distinguished by the testers, and one aqueous solution of monosodium L-aspartate containing a minute quantity of sodium inosinate with instructions to assign ranks to the samples.

A. Concentration of tested solutions:

| Sample | | 1 | 2 | 3 | 4 | Control |
|---|---|---|---|---|---|---|
| Table salt | percent | 1.0 | 1.0 | 1.0 | 1.0 | 1.0 |
| Glutamate | do | 0.4 | 0.3 | 0.2 | 0.1 | 0 |
| Inosinate | do | 0 | 0 | 0 | 0 | 0.01 |
| Aspartate | do | 0 | 0 | 0 | 0 | 0.10 |

B. Results of the test:

| Sample | 1 | 2 | 3 | 4 | Control |
|---|---|---|---|---|---|
| | Number of testers | | | | |
| Rank assigned: | | | | | |
| No. 1 | 6 | 0 | 0 | 0 | 4 |
| No. 2 | 3 | 3 | 1 | 0 | 3 |
| No. 3 | 0 | 5 | 4 | 0 | 1 |
| No. 4 | 1 | 2 | 4 | 1 | 2 |
| No. 5 | 0 | 0 | 1 | 9 | 0 |
| Total | 16 | 29 | 35 | 49 | 21 |
| Mean rank | 1.6 | 2.9 | 3.5 | 4.9 | 2.1 |

NOTE:
Coefficient of concordance — W = 0.664
Statistic — $F_0$ = 17.79
Degrees of freedom — $\phi_1$ = 4; $\phi_2$ = 34
Level of significance — 1%
Rank — 1 · Control > 2 > 3 > 4

From these results, it is seen that the strength of the taste of a solution containing 0.01% of monosodium L-aspartate and 0.01% of sodium inosinate is on a par with that of a solution containing 0.3–0.4% of monosodium glutamate.

To permit the use of an aspartate-inosinate composition as a flavoring, it is necessary that many people would consider the taste of such a composition similar to that of monosodium glutamate. 49 testers were given an aqueous solution containing 0.2% of monosodium L-aspartate and 0.01% of sodium inosinate and another aqueous solution containing 0.2% of monosodium L-aspartate only. 46 testers described the taste of the former solution to be very pleasant or similar to monosodium glutamate, while only 14 testers described the taste of the latter solution to be weakly pleasant. From these results, it is concluded that many people will enjoy the taste of monosodium L-aspartate containing minute quantity of sodium inosinate in the same way as monosodium glutamate.

The proper amount of sodium inosinate to be added to monosodium L-aspartate has been found to be within the range from 2/100 to 20/100. Satisfactory effects have been reported when mixtures prepared from the two compounds in such a ratio were added to consommé and the like in a concentration between 0.1% and 0.3%.

It has been further found that the addition of an extremely minute quantity of sodium inosinate, lower than its threshold value, to the monosodium salt of L-homocysteic acid having the formula

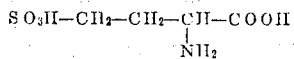

$$SO_3H-CH_2-CH_2-CH-COOH$$
$$|$$
$$NH_2$$

strongly enhances the taste of the latter in the same manner as with monosodium L-aspartate.

For the organoleptic test of monosodium L-homocysteate, 10 sensitive testers were selected from about 70 taste testers.

The threshold value of monosodium L-homocysteate, which had never been determined, was found by them to be 0.015%.

The taste testers clearly distinguished aqueous solutions containing 0.1% of monosodium L-homocysteate and 0.00025% or more of sodium inosinate from corresponding solutions containing L-homocysteate only. They also distinguished aqueous solutions containing 0.01% of sodium inosinate and 0.001% or more of monosodium L-homocysteate from corresponding solutions containing inosinate only. The following table shows the results of a three-way test.

A. Composition of tested solutions (1% of table salt was contained in each):

| Sample | L-monosodium homocysteate (percent) | Sodium inosinate (percent) |
|---|---|---|
| 1 | 0.1 | 0 |
| 2 | 0.1 | 0.001 |
| 3 | 0.1 | 0.0005 |
| 4 | 0.1 | 0.00025 |
| 5 | 0 | 0.01 |
| 6 | 0.004 | 0.01 |
| 7 | 0.002 | 0.01 |
| 8 | 0.001 | 0.01 |
| 9 | 0.0005 | 0.01 |

B. Results of the test:

| Combination of samples | | Number of testers | Number of times correctly sensed | Level of significance |
|---|---|---|---|---|
| 1 | 1 | 2 | 10 | 9 | * * * |
| 1 | 1 | 3 | 10 | 10 | * * * |
| 1 | 1 | 4 | 10 | 7 | * |
| 5 | 5 | 6 | 10 | 10 | * * * |
| 5 | 5 | 7 | 10 | 10 | * * * |
| 5 | 5 | 8 | 10 | 7 | * |
| 5 | 5 | 9 | 10 | 3 | — |

As is evident from the experiment, in an aqueous solution containing both homocysteate and inosinate, the strength of the taste of either is enhanced by the other even when the amount of one of them is as little as 1/100 of its threshold value. In other words, there is a very strong mutual accentuation and taste-activating effect between sodium homocysteate and inosinate.

A taste panel was given four aqueous solutions of different concentrations of monosodium L-glutamate, which could be clearly distinguished by the testers, and one aqueous solution of monosodium L-homocysteate containing a minute quantity of sodium inosinate. The panel was instructed to assign ranks to the samples.

EXPERIMENT 1

A. Concentration of tested solutions:

| Sample | 1 | 2 | 3 | 4 | Control |
|---|---|---|---|---|---|
| Table salt...........percent.. | 1.0 | 1.0 | 1.0 | 1.0 | 1.0 |
| L-glutamate..........do.... | 0.4 | 0.3 | 0.2 | 0.1 | 0 |
| Inosinate............do.... | 0 | 0 | 0 | 0 | 0.001 |
| L-homocysteate.......do.... | 0 | 0 | 0 | 0 | 0.050 |

B. Results of the test:

| Sample | 1 | 2 | 3 | 3 | Control |
|---|---|---|---|---|---|
| | Number of Testers | | | | |
| Rank assigned: | | | | | |
| No. 1.................. | 9 | 1 | 0 | 0 | 0 |
| No. 2.................. | 1 | 9 | 0 | 0 | 0 |
| No. 3.................. | 0 | 0 | 10 | 0 | 0 |
| No. 4.................. | 0 | 0 | 0 | 0 | 10 |
| No. 5.................. | 0 | 0 | 0 | 10 | 0 |
| Total.................. | 11 | 19 | 30 | 50 | 40 |
| Mean rank............. | 1.1 | 1.9 | 3.0 | 5.0 | 4.0 |

NOTE:
Coefficient of concordance—$W = 0.982$
Statistic—$F_0 = 491$
Degrees of freedom—$\phi_1 = 4$; $\phi_2 = 34$
Level of significance—1%

EXPERIMENT 2

A. Concentration of tested solutions:

| Sample | 1 | 2 | 3 | 4 | Control |
|---|---|---|---|---|---|
| Table salt..........Percent.. | 1.0 | 1.0 | 1.0 | 1.0 | 1.0 |
| L-glutamate..........do.... | 0.4 | 0.3 | 0.2 | 0.1 | 0 |
| Inosinate............do.... | 0 | 0 | 0 | 0 | 0.002 |
| L-homocysteate.......do.... | 0 | 0 | 0 | 0 | 0.050 |

B. Results of the test:

| Sample | 1 | 2 | 3 | 4 | Control |
|---|---|---|---|---|---|
| | Number of Testers | | | | |
| Rank assigned: | | | | | |
| No. 1.................. | 3 | 0 | 0 | 0 | 7 |
| No. 2.................. | 7 | 1 | 0 | 0 | 2 |
| No. 3.................. | 0 | 8 | 1 | 0 | 1 |
| No. 4.................. | 0 | 1 | 8 | 1 | 0 |
| No. 5.................. | 0 | 0 | 1 | 9 | 0 |
| Total.................. | 17 | 30 | 40 | 49 | 14 |
| Mean rank............. | 1.7 | 3.0 | 4.0 | 4.9 | 1.4 |

NOTE:
Coefficient of concordance—$W = 0.886$
Statistic—$F_0 = 70$
Degrees of freedom—$\phi_1 = 4$; $\phi_2 = 34$
Level of significance—1%

The strength of the taste of a solution containing 0.05% of monosodium L-homocysteate and 0.001% of sodium inosinate is on a par with that of a solution containing 0.1–0.2% of monosodium L-glutamate. When the quantity of sodium inosinate is doubled, a solution containing 0.05% of monosodium L-homocysteate and 0.002% of sodium inosinate is about as strong as a 4% solution of monosodium L-glutamate.

A suitable amount of sodium inosinate to be added to monosodium L-homocysteate has been found to be within the range from 1/100 to 15/100. Satisfactory effects have been reported when mixtures prepared from the two compounds in such ratios were added to dishes in a concentration between 0.1–0.3%.

It has been further found that the addition of an extremely minute quantity of sodium inosinate, even less than its threshold value, to the monosodium salt of threo-β-hydroxy-L-glutamic acid having the chemical formula $$HOOC-CH_2-CH_2-CH-COOH$$
$$\quad\quad\quad\quad\quad\quad | \quad\quad |$$
$$\quad\quad\quad\quad\quad\quad OH \quad NH_2$$

strongly enhances the taste of the latter in the same manner as with monosodium L-homocysteate.

The organoleptic tests of β-hydroxy-glutamate were performed in a similar way as described above, and the results of the experiments are reliable and have scientific significance.

The threshold value of monosodium threo-β-hydroxy-L-glutamate, which had never been determined, was found to be 0.03%.

The taste testers clearly distinguished between aqueous solutions containing 0.1% of monosodium threo-β-hydroxy-L-glutamate and others additionally containing 0.0001% or more of sodium inosinate. In comparing 0.01% aqueous solutions of sodium inosinate (1/2.5 of the threshold value) with and without 0.001% or more of said β-hydroxy-glutamate (1/30 of the threshold value) the taste testers sensed the difference. The following table shows the results of the sensory comparison by a three-way test.

A. Concentration of tested solutions (1% of table salt additionally added to each):

| Sample | β-hydroxy-glutamate (percent) | Sodium inosinate (percent) |
|---|---|---|
| 1.................. | 0.1 | 0 |
| 2.................. | 0.1 | 0.0003 |
| 3.................. | 0.1 | 0.0002 |
| 4.................. | 0.1 | 0.0001 |
| 5.................. | 0 | 0.01 |
| 6.................. | 0.005 | 0.01 |
| 7.................. | 0.002 | 0.01 |
| 8.................. | 0.001 | 0.01 |

B. Results of the test:

| Combination of samples | | | Number of testers | Number of times correctly sensed | Level of significance |
|---|---|---|---|---|---|
| 1 | 1 | 2 | 12 | 11 | * * * |
| 1 | 1 | 3 | 12 | 9 | * * * |
| 1 | 1 | 4 | 12 | 8 | * * |
| 5 | 5 | 6 | 12 | 12 | * * * |
| 5 | 5 | 7 | 12 | 12 | * * * |
| 5 | 5 | 8 | 12 | 8 | * * |

In an aqueous solution containing both β-hydroxy-glutamate and inosinate, the strength of the taste of each is enhanced by the other even when the amount of one of them is as little as 1/300 of its threshold value. In other words, there is a strong mutual accentuation and a taste-activating effect between β-hydroxy-glutamate and inosinate.

A solution containing 0.1% of β-hydroxy-glutamate and 0.001 g./dl. of sodium inosinate was tested for strength of its taste.

A. Concentration of tested solutions (percent):

| Sample | A | B | C | D | E |
|---|---|---|---|---|---|
| Table salt................ | 1.0 | 1.0 | 1.0 | 1.0 | 1.0 |
| Sodium glutamate......... | 0.4 | 0.3 | 0.2 | 0.1 | 0 |
| β-hydroxy-glutamate...... | 0 | 0 | 0 | 0 | 0.1 |
| Sodium inosinate......... | 0 | 0 | 0 | 0 | 0.001 |

B. Result of judgment (45 testers):

| Sample | A | B | C | D | E |
|---|---|---|---|---|---|
| | \multicolumn{5}{c|}{Number of Testers} | | | | |
| Rank assigned: | | | | | |
| No. 1 | 33 | 6 | 2 | 2 | 2 |
| No. 2 | 11 | 24 | 3 | 1 | 6 |
| No. 3 | 1 | 10 | 17 | 2 | 15 |
| No. 4 | 0 | 4 | 17 | 8 | 16 |
| No. 5 | 0 | 1 | 6 | 32 | 6 |
| Total | 58 | 105 | 157 | 202 | 153 |
| Mean rank | 1.29 | 2.33 | 3.49 | 4.49 | 3.40 |

NOTE:
Coefficient of concordance—$W = 0.5988$
Statistic—$F_0 = 65.61$
Degrees of freedom—$\phi_1 = 3$; $\phi_2 = 130$
Level of significance—1%
Rank—$A > B > E = C > D$ The strength of the taste of a solution containing 0.05% of β-hydroxy-glutamate and 0.002% of sodium inosinate is on a par with that of a solution containing 0.2–0.3% of monosodium L-glutamate.

A solution containing 0.05% of β-hydroxy-glutamate and 0.002% of sodium inosinate was tested for strength of its taste.

A. Concentration of tested solutions (percent):

| Sample | F | G | H | I | J |
|---|---|---|---|---|---|
| Table salt | 1.0 | 1.0 | 1.0 | 1.0 | 1.0 |
| Sodium glutamate | 0.4 | 0.3 | 0.2 | 0.1 | 0 |
| β-hydroxy-glutamate | 0 | 0 | 0 | 0 | 0.05 |
| Sodium inosinate | 0 | 0 | 0 | 0 | 0.002 |

B. Result of judgment (47 testers):

| Sample | F | G | H | I | J |
|---|---|---|---|---|---|
| | \multicolumn{5}{c|}{Number of Testers} | | | | |
| Rank assigned: | | | | | |
| No. 1 | 34 | 6 | 2 | 0 | 5 |
| No. 2 | 11 | 21 | 3 | 0 | 12 |
| No. 3 | 2 | 15 | 11 | 1 | 18 |
| No. 4 | 0 | 5 | 30 | 4 | 8 |
| No. 5 | 0 | 0 | 1 | 42 | 4 |
| Total | 62 | 113 | 166 | 229 | 135 |
| Mean rank | 1.32 | 2.40 | 3.53 | 4.87 | 2.87 |

NOTE:
Coefficient of concordance—$W = 0.6914$
Statistic—$F_0 = 103$
Degrees of freedom—$\phi_1 = 4$; $\phi_2 = 164$
Level of significance—1%
Rank—$F > G > J > H > I$ The strength of the taste of a solution containing 0.05% of β-hydroxy-glutamate and 0.002% of sodium inosinate is on a par with that of a solution containing 0.2–0.3% of monosodium glutamate. The seasoning effect of β-hydroxy-glutamate is equal to that of monosodium glutamate, and is strongly enhanced by adding a minute quantity, less than the threshold amount of sodium inosinate.

A suitable amount of sodium inosinate to be added to monosodium threo-β-hydroxy-L-glutamate has been found to be within the range from 1/100 to 10/100. Satisfactory effects have been reported when products prepared from the two compounds in such a ratio were added to dishes in a concentration between 0.1–0.3%.

It has further been found that the addition of an extremely minute quantity of sodium inosinate, less than its threshold value, to the monosodium salt of L-α-amino-adipic acid having the chemical formula

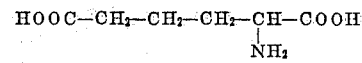

greatly enhances the taste of the latter.

For an organoleptic test of α-amino-adipate, 10 special testers were selected from a group of about 70 taste testers.

The threshold value of monosodium L-α-amino-adipate, which had heretofore not been determined, was found by them to be 0.25%.

The taste testers clearly discriminated between an aqueous solution containing 0.1% of α-amino-adipate (1/2.5 of the threshold value) and 0.0025% of sodium inosinate (1/10 of the threshold value) and another aqueous solution containing the same amount of α-amino-adipate only. They clearly discriminated also between aqueous solutions containing 0.01% of sodium inosinate (1/2.5 of the threshold value) and 0.02% (1/10 of the threshold value) or more of said α-amino-adipate and another aqueous solution containing said amount of said inosinate only. The following table shows the results a threeway test.

A. Concentration of tested solutions (1% of table salt added):

| Sample | α-amino-adipate | Sodium inosinate |
|---|---|---|
| 1 | 0.1 | 0 |
| 2 | 0.1 | 0.0050 |
| 3 | 0.1 | 0.0025 |
| 4 | 0.1 | 0.0013 |
| 5 | 0.1 | 0.0007 |
| 6 | 0 | 0.01 |
| 7 | 0.02 | 0.01 |
| 8 | 0.01 | 0.01 |
| 9 | 0.005 | 0.01 |
| 10 | 0.0025 | 0.01 |

B. Results of the test:

| Combination of samples | | Number of testers | Number of times correctly sensed | Level of significance |
|---|---|---|---|---|
| 1 | 1 | 2 | 10 | 10 | *** |
| 1 | 1 | 3 | 10 | 10 | *** |
| 1 | 1 | 4 | 10 | 4 | — |
| 1 | 1 | 5 | 10 | 6 | — |
| 6 | 6 | 7 | 10 | 10 | *** |
| 6 | 6 | 8 | 10 | 5 | — |
| 6 | 6 | 9 | 10 | 4 | — |
| 6 | 6 | 10 | 10 | 5 | — |

In an aqueous solution containing sodium α-amino-adipate and sodium inosinate, a significant taste can be sensed even when the amount of either compound is lower than its threshold value. In other words, there is strong mutual accentuation and a taste-activating effect between the adipate and inosinate.

The strength of the taste was tested for a solution containing 0.1% of sodium amino adipate and 0.01% of sodium inosinate.

A. Concentration of tested solutions (percent):

| Sample | A | B | C | D | E |
|---|---|---|---|---|---|
| Table salt | 1.0 | 1.0 | 1.0 | 1.0 | 1.0 |
| Sodium glutamate | 0.3 | 0.2 | 0.1 | 0.05 | 0 |
| α-amino-adipate | 0 | 0 | 0 | 0 | 0.10 |
| Sodium inosinate | 0 | 0 | 0 | 0 | 0.01 |

B. Result of judgment:

| Sample | A | B | C | D | E |
|---|---|---|---|---|---|
| | \multicolumn{5}{c}{Number of Testers} | | | | |
| Rank assigned: | | | | | |
| No. 1 | 4 | 0 | 0 | 0 | 6 |
| No. 2 | 6 | 0 | 0 | 0 | 4 |
| No. 3 | 0 | 10 | 0 | 0 | 0 |
| No. 4 | 0 | 0 | 7 | 3 | 0 |
| No. 5 | 0 | 0 | 3 | 7 | 0 |
| Total | 16 | 30 | 43 | 47 | 14 |
| Mean rank | 1.6 | 3.0 | 4.3 | 4.7 | 1.4 |

NOTE:
Coefficient of concordance—$W=0.91$
Statistic—$F_0=91$
Degrees of freedom—$\phi_1=4$; $\phi_2=34$
Level of significance—1%
Rank—$E>A>B>C>D$ The strength of the taste of a solution containing 0.1% of said α-amino-adipate and 0.01% of sodium inosinate is on a par with that of a solution containing 0.3% of monosodium L-glutamate.

The strength of the taste of a solution containing 0.1% of said adipate and 0.005% of sodium inosinate was tested as follows.

A. Concentration of tested solutions (percent):

| Sample | F | G | H | I | J |
|---|---|---|---|---|---|
| Table salt | 1.0 | 1.0 | 1.0 | 1.0 | 1.0 |
| Sodium glutamate | 0.30 | 0.20 | 0.10 | 0.05 | 0 |
| α-amino-adipate | 0 | 0 | 0 | 0 | 0.10 |
| Sodium inosinate | 0 | 0 | 0 | 0 | 0.005 |

B. Result of judgment:

| Sample | F | G | H | I | J |
|---|---|---|---|---|---|
| | \multicolumn{5}{c}{No. of Testers} | | | | |
| Rank assigned: | | | | | |
| No. 1 | 8 | 0 | 0 | 0 | 2 |
| No. 2 | 2 | 6 | 0 | 0 | 2 |
| No. 3 | 0 | 3 | 1 | 1 | 5 |
| No. 4 | 0 | 1 | 7 | 1 | 1 |
| No. 5 | 0 | 0 | 2 | 8 | 0 |
| Total | 12 | 25 | 41 | 47 | 25 |
| Mean rank | 1.2 | 2.5 | 4.1 | 4.7 | 2.5 |

NOTE:
Coefficient of concordance—$W=0.784$
Statistic—$F_0=37.30$
Degrees of freedom—$\phi_1=4$; $\phi_2=34$
Level of significance—1%
Rank—$F>G=J>H>I$ The strength of the taste of a solution containing 0.1% of sodium amino adipate and 0.005% of sodium inosinate, is on a par with that of a solution containing 0.2% of monosodium glutamate.

A suitable amount of sodium inosinate to be added to monosodium L-α-amino-adipate has been found to be within the range from 2/100 to 20/100. Satisfactory effects have been reported when mixtures prepared from the two compounds in such a ratio were added to consommé and other dishes in a concentration between 0.1–0.2%.

For a comparison with the hereinbefore described experiments, aqueous solutions of 16 kinds of natural amino acids other than acidic amino acids, sodium chloride, sucrose, acetic acid, succinic acid and the like with and without addition of inosinic acid in an amount less than its threshold value were tested, but no change of the taste was found to be caused by the inosinate.

Example 1

3 parts by weight of sodium inosinate crystals are intimately mixed with 100 parts of monosodium L-glutamate crystals. The mixed crystals are disintegrated so that the minor component is homogeneously dispersed in the major component.

Example 2

100 parts by weight of monosodium L-glutamate crystals are disintegrated and passed through a 75 mesh screen. 3 parts of sodium inosinate crystals are disintegrated in the same way. Both components are intimately mixed to obtain a homogeneous dispersion.

Example 3

5 parts by weight of sodium inosinate crystals are intimately mixed with 100 parts of monosodium L-aspartate crystals. The mixed crystals are disintegrated so that the minor component is homogeneously dispersed in the major component.

Example 4

100 parts by weight of monosodium L-aspartate crystals are disintegrated and passed through a 100 mesh screen. 10 parts of sodium inosinate crystals are disintegrated in the same way. Both components are intimately mixed to obtain a homogeneous dispersion.

Example 5

1 part by weight of sodium inosinate crystals is intimately mixed with 100 parts of monosodium L-homocysteinate crystals. The mixed crystals are disintegrated so that the minor component is homogeneously dispersed in the major component.

Example 6

100 parts by weight of monosodium L-homocysteinate crystals are disintegrated and passed through a 75 mesh screen. 2 parts of sodium inosinate crystals are disintegrated in the same way. Both components are intimately mixed to obtain a homogeneous dispersion.

Example 7

2 parts by weight of sodium inosinate crystals are mixed with 100 parts of monosodium three-β-hydroxy-L-glutamate crystals. The mixed crystals are disintegrated so that the minor component is homogeneously dispersed in the major component.

Example 8

100 parts by weight of monosodium threo-β-hydroxy-L-glutamate are disintegrated and passed through a 75 mesh screen. 5 parts of sodium inosinate crystals are disintegrated in the same way. Both components are intimately mixed to obtain a homogeneous dispersion.

Example 9

5 parts by weight of sodium inosinate crystals are intimately mixed with 100 parts of monosodium L-α-amino-adipate crystals. The mixed crystals are disintegrated so that the minor component is homogeneously dispersed in the major component.

Example 10

100 parts by weight of monosodium L-α-amino-adipate crystals are disintegrated and passed through a 100 mesh screen. 10 parts of sodium inosinate crystals are disintegrated in the same way. Both components are intimately mixed to obtain a homogeneous dispersion.

What is claimed is:

1. A method for preparing a flavoring which comprises mixing and disintegrating 1–20 parts by weight of sodium inosinate crystals and 100 parts by weight of crystals of the monosodium salt of an α-amino-dicarboxylic acid to disperse the former intimately in the latter.

2. A method for preparing a flavoring which comprises mixing and disintegrating 1–15 parts by weight of sodium inosinate crystals and 100 parts by weight of L-monosodium homocysteinate crystals to disperse the former intimately in the latter.

3. A method for preparing a flavoring as claimed in claim 1 wherein said monosodium salt of an α-amino-dicarboxylic acid is monosodium L-glutamate and the weight ratio thereto of sodium inosinate is between 1/100 and 4/100.

4. A method for preparing a flavoring as claimed in claim 1 wherein said monosodium salt of an α-amino-dicarboxylic acid is monosodium L-aspartate and the weight ratio thereto of sodium inosinate is between 2/100 and 20/100.

5. A method for preparing a flavoring as claimed in claim 1 wherein said monosodium salt of an α-amino-dicarboxylic acid is monosodium threo-β-hydroxy-L-glutamate and the weight ratio thereto of sodium inosinate is between 1/100 and 10/100.

6. A method for preparing a flavoring as claimed in claim 1 wherein said monosodium salt of an α-amino-dicarboxylic acid is monosodium L-α-amino-adipate and the weight ratio thereto of sodium inosinate is between 2/100 and 20/100.

7. A flavoring composition comprising 100 parts by weight of fine crystals of monosodium L-glutamate and dispersed therein 1–4 parts by weight of fine crystals of sodium inosinate.

8. A flavoring composition comprising 100 parts by weight of fine crystals of L-monosodium aspartate and dispersed therein 2–20 parts by weight of fine crystals of sodium inosinate.

9. A flavoring composition comprising 100 parts by weight of fine crystals of monosodium threo-β-hydroxy-L-glutamate and dispersed therein 1–10 parts by weight of fine crystals of sodium inosinate.

10. A flavoring composition comprising 100 parts by weight of fine crystals of monosodium L-α-amino-adipate and dispersed therein 2–20 parts by weight of fine crystals of sodium inosinate.

11. A flavoring composition comprising 100 parts by weight of fine crystals of monosodium L-homocysteate and dispersed therein 1–15 parts by weight of fine crystals of sodium inosinate.

12. A flavoring composition including as the active flavoring agent a mixture of sodium inosinate and of a monosodium salt of an alpha-amino acid selected from the group consisting of glutamic acid, aspartic acid, threo-beta-hydroxy-glutamic acid, aminoadipic acid, and homocysteic acid, said mixture consisting essentially of 100 parts by weight of said monosodium salt and one to twenty parts by weight of said sodium inosinate.

13. A composition as set forth in claim 12, wherein said mixture is crystalline.

14. A composition as set forth in claim 12, further including sodium chloride.

References Cited in the file of this patent
UNITED STATES PATENTS

| | | |
|---|---|---|
| 2,920,965 | Ziegler | Jan. 12, 1960 |
| 2,928,740 | Rosenthal et al. | Mar. 15, 1960 |
| 2,953,456 | Mohler et al. | Sept. 20, 1960 |

OTHER REFERENCES

"The Merck Index," seventh edition, by Stecher et al., publ. by Merck & Co., Inc., Rahway, N.J., 1960, page 555.